US009008516B2

(12) United States Patent
Li et al.

(10) Patent No.: US 9,008,516 B2
(45) Date of Patent: Apr. 14, 2015

(54) METHOD, APPARATUS, AND SYSTEM FOR TRANSMITTING INFORMATION IN PASSIVE OPTICAL NETWORK

(75) Inventors: Kun Li, Chengdu (CN); Shiyi Cao, Shenzhen (CN); Jianlin Zhou, Shenzhen (CN); Min Ye, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 513 days.

(21) Appl. No.: 13/356,430

(22) Filed: Jan. 23, 2012

(65) Prior Publication Data
US 2012/0121258 A1    May 17, 2012

Related U.S. Application Data

(63) Continuation of application No. PCT/CN2010/074772, filed on Jun. 30, 2010.

(30) Foreign Application Priority Data

Jul. 24, 2009   (CN) .......................... 2009 1 0089811

(51) Int. Cl.
*H04J 14/08*    (2006.01)
*H04L 12/24*    (2006.01)
(Continued)

(52) U.S. Cl.
CPC .............. *H04L 41/04* (2013.01); *H04B 10/272* (2013.01); *H04Q 11/0067* (2013.01); *H04Q 2011/0079* (2013.01)

(58) Field of Classification Search
CPC ............. H04B 10/291; H04B 10/2918; H04B 10/297; H04B 10/2972; H04J 14/0272; H04J 14/08

USPC .............. 398/66, 67, 70, 71, 72, 98, 99, 100, 398/173, 174, 175, 180, 181
See application file for complete search history.

(56) References Cited

U.S. PATENT DOCUMENTS

| 7,450,515 B2 | 11/2008 | Song et al. |
| 2003/0133460 A1 | 7/2003 | Lee et al. |

(Continued)

FOREIGN PATENT DOCUMENTS

| CN | 1433192 A | 7/2003 |
| CN | 1522523 A | 8/2004 |

(Continued)

OTHER PUBLICATIONS

Extended European Search Report dated May 4, 2012 in connection with European Patent Application No. 10801927.4, 8 pages.

(Continued)

*Primary Examiner* — Daniel Dobson

(57) ABSTRACT

A method, an apparatus, and a system for transmitting information in a passive optical network are provided. The method mainly includes: obtaining OAM information that an RE device needs to report to an OLT device, performing modulation processing, according to the OAM information, on a downlink optical signal sent by the OLT device, and returning the downlink optical signal after the modulation processing to the OLT device; or, obtaining OAM information that an OLT device needs to deliver to an RE device, performing modulation processing, according to the OAM information, on a downlink optical signal sent by the OLT device to the RE device, and sending the downlink optical signal after the modulation processing to the RE device.

13 Claims, 4 Drawing Sheets

(51) Int. Cl.
 *H04B 10/272* (2013.01)
 *H04Q 11/00* (2006.01)
 *H04B 10/00* (2013.01)

(56) References Cited

U.S. PATENT DOCUMENTS

| | | | |
|---|---|---|---|
| 2004/0196869 A1 | 10/2004 | Tsuchida et al. | |
| 2005/0019036 A1 | 1/2005 | Soto et al. | |
| 2009/0226170 A1 | 9/2009 | Zou | |
| 2011/0317995 A1* | 12/2011 | Zheng | 398/2 |

FOREIGN PATENT DOCUMENTS

| | | | |
|---|---|---|---|
| CN | 101136703 A | | 3/2008 |
| CN | 101405971 A | | 4/2009 |
| CN | 101478343 A | | 7/2009 |
| CN | 101478348 A | | 7/2009 |
| GB | 2 268 852 A | | 1/1994 |
| JP | 2002271271 A | | 9/2002 |
| KR | 20070055035 A | | 5/2007 |
| WO | WO 2008/117035 A1 | | 10/2008 |

OTHER PUBLICATIONS

Written Opinion dated Oct. 21, 2010 in connection with International Patent Application No. PCT/CN2010/074772, 7 pages.
Thomas Pfeiffer; "Network integration of the GPON Extender Box (Midspan)" Alcatel-Lucent, FSAN Meeting Middletown, N.J.; Nov. 7/8, 2007;10 pages.
Ge Lei; "The Feasibility of GSM900/WCDMA Shared Antenna and Feeder" WCDMA-GSM900, China Academic Journal Electronic Publishing House; 1994-2009, 3 pages.
International Telecommunication Union, ITU-T G.984.6; Gigabit-capable Passive Optical Networks (GPON): Reach extension (ex G.984.re-GPON optical reach extension); Mar. 2008; pp. 1-37.
International Search Report dated Oct. 21, 2010 in connection with International Patent Application No. PCT/CN2010/074772.
Partial translation of Office Action dated Dec. 5, 2012 in connection with Chinese Patent Application No. 200910089811.2.

* cited by examiner

METHOD, APPARATUS, AND SYSTEM FOR TRANSMITTING INFORMATION IN PASSIVE OPTICAL NETWORK

CROSS-REFERENCE TO RELATED APPLICATIONS

This application is a continuation of international Application No. PCT/CN2010/074772, filed on Jun. 30, 2010, which claims priority to Chinese Patent Application No. CN 200910089811.2, filed on Jul. 24, 2009, both of which are hereby incorporated by reference in their entireties.

TECHNICAL FIELD

The present invention relates to the technical field of PON (Passive Optical Network), and in particular, to a method, an apparatus, and a system for transmitting information in a PON.

BACKGROUND

With the rise of emerging services such as Video On Demand, high definition television, and online games, user's requirements for bandwidth grow increasingly, and the development of Fiber To The Home can effectively ensure the "Last Mile" access network bandwidth. A PON system is one of the most widely applied Fiber To The Home technologies at present.

FIG. 1 is a schematic diagram of the constitution of a PON system and the position of the PON system in a conventional network architecture. The PON system mainly includes an OLT (Optical Line Terminals), ONUs (Optical Network Units), an optical splitter, and an ODN (Optical Distribution Network). The OLT and the optical splitter are connected to each other through a trunk fiber, and the optical splitter implements point-to-multipoint optical power distribution and is connected to multiple ONUs through multiple branch fibers. The trunk fiber, the optical splitter, and the branch fibers between the OLT and the ONUs are collectively referred to as the ODN. The direction from the OLT to the ONUs is referred to as a downlink direction, and the direction from the ONUs to the OLT is referred to as an uplink direction.

In the conventional PON system, the split ratio of the optical splitter ranges from 1:16 and 1:32 to 1:64 with a maximum of 1:128 which is optional. The OLT is connected to few ONUs through the optical splitter and has a covering radius of not more than 20 km, so that a large number of OLTs exist in the conventional network architecture and are located in remote areas in a dispersed manner, resulting in inconvenience in administration and maintenance and high device investment and maintenance cost. The reach extension of the PON can simplify network layers such as an access layer and a convergence layer, reduce the number of network nodes, increase the number of users connected to a single OLT, apportion the cost to a large extent, and finally reduce device investment and save administration and maintenance cost.

A basic architecture of an LR-PON (Long Reach PON) is as shown in FIG. 2. An RE (Reach Extension device is placed between an optical splitter and an OLT, and the RE device may be in an electrical relay manner or an all-optical relay manner. After the RE device is added, the conventional ODN network is divided into two ODN networks, namely, ODN1 and ODN2. In the all-optical relay manner, the all-optical RE device implements a function such as amplifying an optical signal.

The basic architecture of the LR-PON shown in FIG. 2 has the following problems.

1. An active RE device is introduced, and the stability and reliability of the entire ODN network are not as good as those of previous passive optical nodes.

2. The fiber transmission path is extended from the previous range of less than 20 km to a range of greater than 100 km, which introduces the fault probability of the long reach fiber path.

3. The coverage is expanded, and the number of users connected to the OLT is several to tens of times the previous one, resulting in wide range of influence on services caused by a fault.

4. With the addition of the RE device, the fiber path is divided into two or more segments, and if a segment of the path fails, the fault cause and fault point need to be located as soon as possible for processing without delay.

Due to the above several reasons, in the application of the LR-PON, the optical signal and the RE device per se need to be monitored and corresponding information such as alarm and performance needs to be generated, so as to implement functions, for example, protection and fault location. Therefore, it is necessary to establish a communication channel between the RE device and the OLT device to support the OAM (Operation, Administration and Maintenance) function for the RE device.

One solution for establishing the communication channel between the RE device and the OLT device in the prior art mainly includes: putting OAM information between the RE device and the OLT device in an uplink/downlink GTC (GPON Transmission Convergence) or GEM (GPON Encapsulation Mode) frame. In order to not affect the existing customer service, the line speed between the RE device and the OLT device may be increased, and the increased line speed may be used to accommodate the OAM information. The OLT and the RE device perform operations such as optical-electrical conversion, deframing/framing, and electrical-optical conversion to take out the OAM information from the GTC or GEM frame.

During the implementation of the present invention, the inventors find that this solution for establishing the communication channel between the RE device and the OLT device in the prior art at least has the following problem.

The line speed between the RE device and the OLT device needs to be increased, the existing PON system needs to be changed, and the solution is incompatible with the existing OLT device. The RE device and the OLT device have to perform the operations such as optical-electrical-optical conversion and deframing/framing to take out the OAM information from the GTC or GEM frame, so the processing is complicated and the cost is high.

Another solution for establishing the communication channel between the RE device and the OLT device in the prior art mainly includes: using a newly added wavelength different from wavelengths in uplink and downlink directions of the PON for establishing the communication channel between the all-optical RE device and the OLT device. OAM information between the RE device and the OLT device is transported through the communication channel established using the newly added wavelength.

During the implementation of the present invention, the inventors find that this solution for establishing the communication channel between the RE device and the OLT device in the prior art has at least the following problem.

The RE device and the OLT device need to process the newly added wavelength, so the implementation is complicated, great changes are made to the existing RE device and OLT device, and the device cost of the RE and OLT is increased.

SUMMARY

Embodiments of the present invention provide a method, an apparatus, and a system for transmitting information in a PON, so as to transmit OAM information between an RE device and an OLT device without affecting the existing PON system or increasing the line speed of the PON.

A Reach Extension (RE) device includes:

a downlink optical signal demodulation unit, configured to demodulate a downlink optical signal sent by an Optical Line Terminal (OLT) device to obtain downlink Operation, Administration and Maintenance (OAM) information that is included in the downlink optical signal and sent by the OLT device to the RE device;

an OAM information processing unit, configured to receive the downlink OAM information sent by the downlink optical signal demodulation unit;

a control unit, configured to generate uplink OAM information that needs to be reported to the OLT device and send the uplink OAM information to the OAM information processing unit, and receive the downlink OAM information sent by the OAM information processing unit; and an uplink optical signal modulation unit, configured to perform modulation processing, according to the uplink OAM information sent by the OAM information processing unit, on the downlink optical signal sent by the OLT device, and send the optical signal after the modulation processing and including the uplink OAM information to the OLT device.

An OLT device includes:

an RE returned optical signal extraction unit, configured to extract an optical signal returned by an RE device from optical signals received by the OLT device;

an optical signal demodulation unit, configured to demodulate the optical signal sent by the RE returned optical signal extraction unit to obtain uplink OAM information in the optical signal;

an OAM information processing unit, configured to receive the uplink OAM information sent by the optical signal demodulation unit;

a control unit, configured to generate downlink OAM information that needs to be sent to the RE device and send the downlink OAM information to the OAM information processing unit, and receive the uplink OAM information sent by the OAM information processing unit; and an optical signal modulation unit, configured to perform modulation processing, according to the downlink OAM information sent by the OAM information processing unit, on a downlink optical signal sent to the RE device, and send the optical signal after the modulation processing and including the downlink OAM information to the RE device.

A communications system in a passive optical network includes the RE device and the OLT device, where the RE device performs modulation processing, according to uplink OAM information that needs to be reported to the OLT device, on a downlink optical signal sent by the OLT device, and sends the optical signal after the modulation processing and including the uplink OAM information to the OLT device; and the OLT device performs modulation processing, according to downlink OAM information that needs to be delivered to the RE device, on a downlink optical signal sent by the OLT device to the RE device, and sends the optical signal after the modulation processing and including the downlink OAM information to the RE device.

A method for transmitting OAM information between a Reach Extension (RE) device and an Optical Line Terminal (OLT) device includes:

obtaining uplink OAM information that the RE device needs to report to the OLT device, performing modulation processing, according to the uplink OAM information, on a downlink optical signal sent by the OLT device, and sending the optical signal after the modulation processing and including the uplink OAM information to the OLT device;

obtaining downlink OAM information that the OLT device needs to deliver to the RE device, performing modulation processing, according to the downlink OAM information, on a downlink optical signal sent by the OLT device to the RE device, and sending the optical signal after the modulation processing and including the downlink OAM information to the RE device.

It can be seen from the technical solutions provided in the embodiments of the present invention that, in the embodiments of the present invention, the RE device uses OAM information to perform modulation processing on a downlink optical signal sent by the OLT device and returns the optical signal after the modulation processing to the OLT device; and the OLT device uses OAM information to perform modulation processing on a downlink optical signal sent to the RE device. The OAM information can be transmitted between the RE device and the OLT device, and the administration and control function for the all-optical RE device by the OLT device can be implemented, without affecting the existing PON system or increasing the line speed of the PON.

BRIEF DESCRIPTION OF THE DRAWINGS

To illustrate the technical solutions in the embodiments of the present invention more clearly, the accompanying drawings for describing the embodiments are introduced briefly in the following. Apparently, the accompanying drawings in the following description are only some embodiments of the present invention, and persons of ordinary skilled in the art can derive other drawings from the accompanying drawings without creative efforts.

DETAILED DESCRIPTION

In embodiments of the present invention, uplink OAM information that an RE device needs to report to an OLT device is obtained, modulation processing is performed, according to the uplink OAM information, on a downlink optical signal sent by the OLT device, and the optical signal after the modulation processing and including the uplink OAM information is sent to the OLT device.

Downlink OAM information that an OLT device needs to deliver to an RE device is obtained, modulation processing is performed, according to the downlink OAM information, on a downlink optical signal sent by the OLT device to the RE device, and the optical signal after the modulation processing and including the downlink OAM information is sent to the RE device.

To make the embodiments of the present invention more comprehensible, the present invention is further illustrated in the following through several specific embodiments with reference to the accompanying drawings, and the embodiments are not intended to limit the embodiments of the present invention.

Embodiment 1

Figure 1:
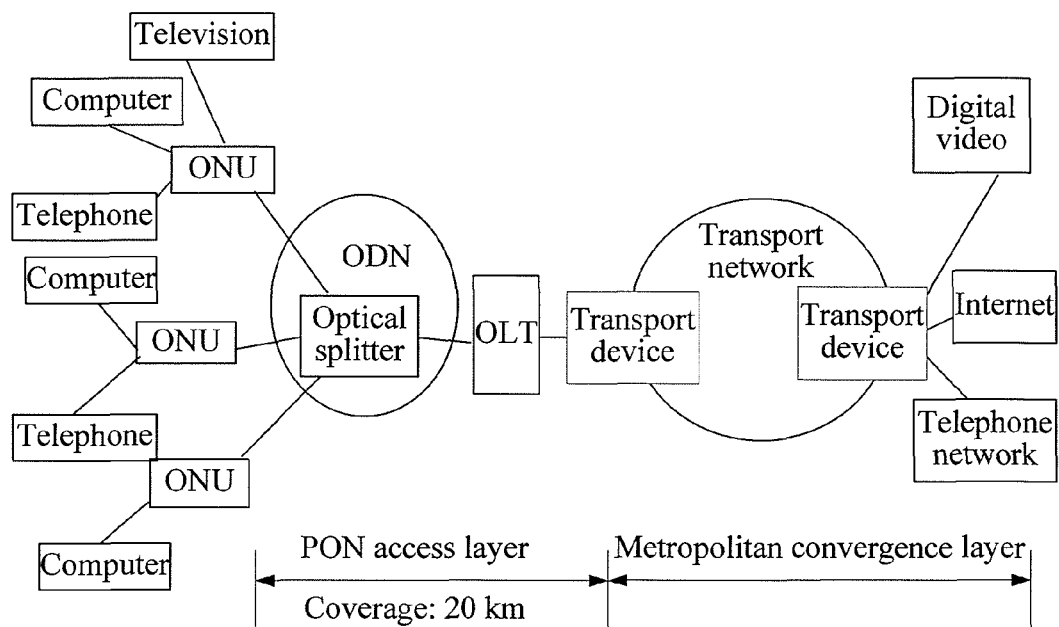
FIG. 1 is a schematic diagram of the constitution of a PON system and the position of the PON system in a conventional network architecture in the prior art.
Figure 2:
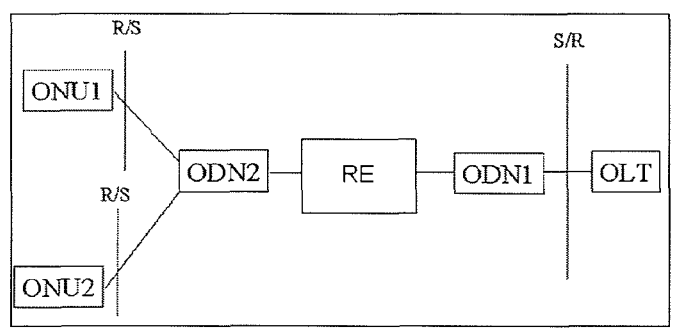
FIG. 2 is a schematic diagram of a basic architecture of an LR-PON in the prior art.
Figure 3:
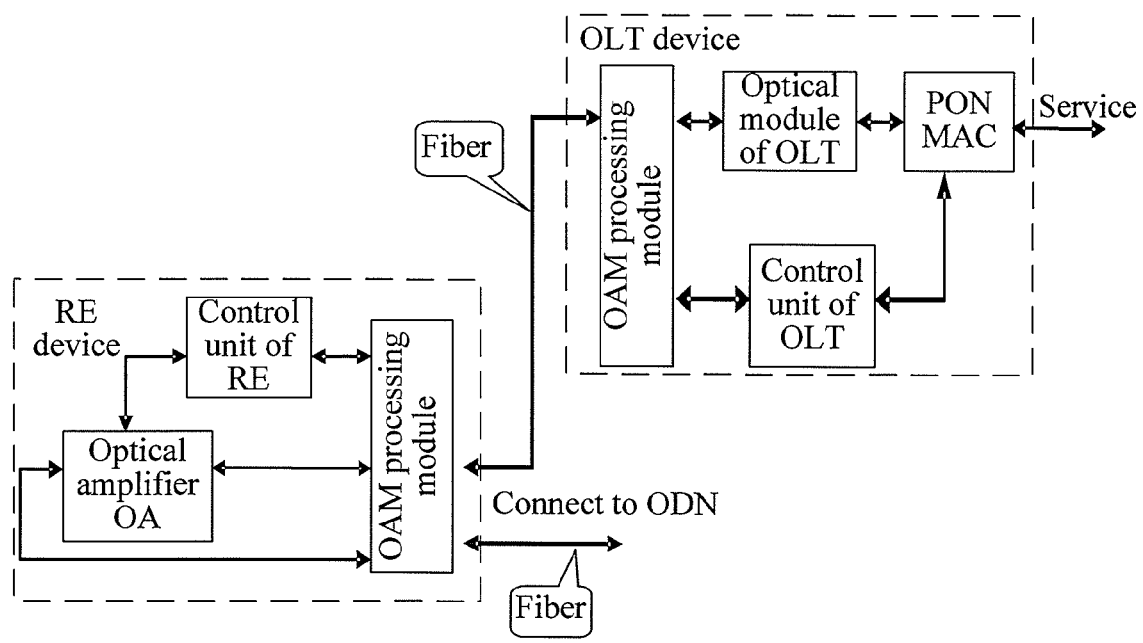
FIG. 3 is a schematic structural diagram of a system for transmitting administration information between an RE device and an OLT device that are provided in Embodiment 1 of the present invention.

FIG. 3 is a schematic structural diagram of a system for transmitting administration information between an RE device and an OLT device that are provided in the embodiment. As shown in FIG. 3, the system includes an all-optical RE device and an OLT device.

An OAM processing module is added in the all-optical RE device. The OAM processing module separates a part of optical signals in the downlink direction sent by the OLT device to the all-optical RE device, modulates the part of optical signals, in which uplink OAM information that needs to be transferred to the OLT may be encapsulated in the optical signal during the modulation, and then returns the modulated optical signal to the OLT, thereby establishing a communication channel from the all-optical RE device to the OLT device.

An OAM processing module is also added in the OLT device. The OAM processing module directly modulates continuous optical signals in the downlink direction sent by the OLT device to the all-optical RE device, in which downlink OAM information that needs to be transferred to the all-optical RE device may be encapsulated in the optical signals during the modulation, and then sends the modulated optical signals to the all-optical RE device, thereby establishing a communication channel from the OLT device to the all-optical RE device.

Through the OAM processing modules added in the all-optical RE device and the OLT device, a bi-directional communication channel between the OLT device and the all-optical RE device is established in the optical layer, and OAM information can be transmitted between the OLT device and the all-optical RE device through the communication channel.

The method for modulating the optical signal by the OAM processing modules in the all-optical RE device and the OLT device may be many manners such as frequency modulation, amplitude modulation, amplitude keying, frequency shift keying, and phase shift keying.

Taking amplitude modulation as an example, the process for modulating the optical signal mainly includes the following steps.

An uplink optical signal modulation unit converts OAM information into a corresponding voltage signal. For example, a binary "1" corresponds to output of a control voltage value in which a VOA does not attenuate an optical signal passing through the VOA, and a binary "0" corresponds to output of a control voltage value in which the VOA attenuates an optical signal passing through the VOA by 5%. The voltage signal is sent to a control end of the VOA for controlling the attenuation of the optical signal passing through the VOA. After the aforementioned processing, the OAM information is modulated onto the optical signal.

The frequency modulation method is similar. For example, 10 KHz with a duration of 0.1 ms is used to represent the binary "1", and 20 KHz with a duration of 0.1 ms is used to represent the binary "0".

When all-optical RE devices are cascaded in use, a different device identifier may be distributed to each all-optical RE device, and the OLT device sends information to a specific all-optical RE device according to the device identifier; similarly, information sent by an all-optical RE device to the OLT device also carries a device identifier of the all-optical RE device. Before the all-optical RE device sends information to the OLT device, the all-optical RE device needs to detect whether a lower-level all-optical RE device is sending information, and if the lower-level all-optical RE device is sending information, the all-optical RE device can send information to the OLT device only after the lower-level all-optical RE device completes sending the information, so as to avoid conflict between optical signals.

In actual application, only a communication channel from the all-optical RE device to the OLT device or only a communication channel from the OLT device to the all-optical RE device may be established according to requirements.

In this embodiment, the problem that modulation cannot be performed due to the absence of optical signals during an uplink burst interval in a PON system can be solved, and the modulation amplitude of an optical signal between the all-optical RE device and the OLT device is appropriately selected while ensuring no influence on the reception of the optical signal of the all-optical RE device and the OLT device, so the existing PON network is not affected.

Taking parameters of Class A lasers in the GPON system as an example, G.894 defines that an average transmit optical power of Class A is between 0 dBm and 4 dBm, while in fact, an average transmit optical power of OLT devices is about 2.5 dBm, and a minimum extinction ratio is 10 dB. In the embodiment of the present invention, the modulation amplitude of 5% may be selected, the average optical power of the transmitting end is at most reduced by 0.22 dB, which is approximately equivalent to the insertion loss of a fiber connector or a fiber of 500 meters long, and as long as the optical power budget of the entire PON system has a redundancy of 0.22 dB, the receiving end has sufficiently strong optical signals. In fact, an optical power budget redundancy of more than 3 dB is at least required in the embodiment of the present invention, so modulation at an amplitude of 5% at the transmitting end does not affect the reception of optical signals. In the implementation of the present invention, the modulation amplitude in transmission is controlled to be 1%-5%.

Embodiment 2

Figure 4:
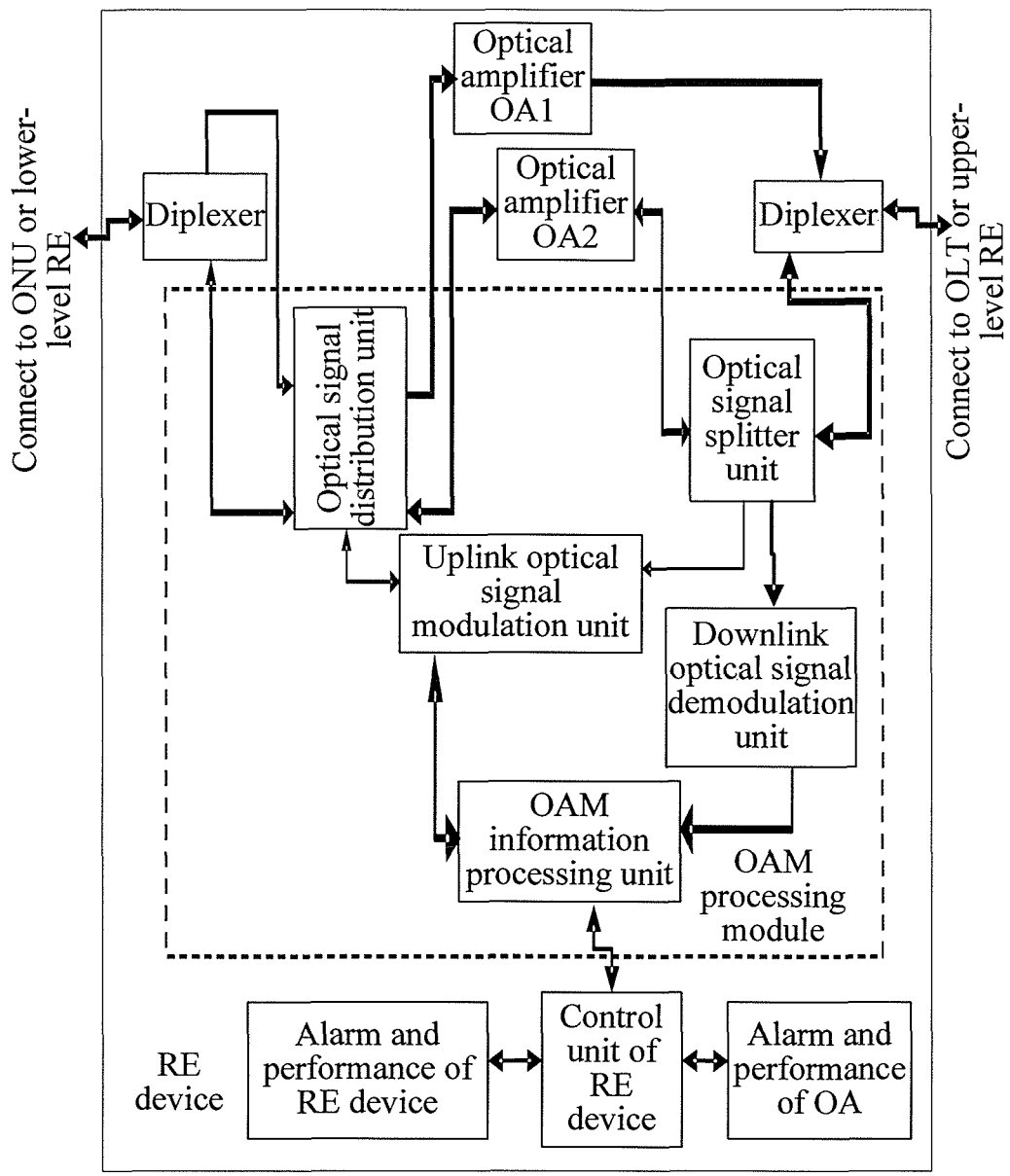
FIG. 4 is a schematic structural diagram of an all-optical RE device provided in Embodiment 2 of the present invention.

FIG. 4 is a schematic structural diagram of an all-optical RE device provided in the embodiment. As shown in FIG. 4, the all-optical RE device includes a downlink optical signal splitter unit, a downlink optical signal demodulation unit, an OAM information processing unit, an uplink optical signal modulation unit, a control unit, and an optical signal distribution unit. The main functions of the modules are as follows.

The downlink optical signal splitter unit is configured to split an optical signal in a downlink direction sent by an OLT device to the all-optical RE device into three signals and send them to the downlink optical signal demodulation unit, the uplink optical signal modulation unit, and an optical amplifier in the downlink direction respectively.

The downlink optical signal demodulation unit is configured to take out an envelope from the downlink optical signal from the OLT device that is transmitted from the downlink optical signal splitter unit, perform a demodulation process corresponding to modulation of the optical signal of the OLT device to obtain downlink OAM information of the OLT device for the all-optical RE device in the envelope, and transmit the downlink OAM information to the OAM information processing unit.

The OAM information processing unit is configured to perform adaptation processing on the downlink OAM information of the OLT device for the all-optical RE device that is transmitted from the downlink optical signal demodulation unit, in which the adaptation processing mainly includes: performing necessary format conversion on the downlink OAM information according to information format requirements of the control unit of the all-optical RE device, and then send the downlink OAM information after the adaptation processing to the control unit of the all-optical RE device; and collect, from the control unit of the all-optical RE device, uplink OAM information that needs to be reported to the OLT, perform adaptation processing on the uplink OAM information, and send the uplink OAM information after the adaptation processing to the uplink optical signal modulation unit of the all-optical RE device.

When all-optical RE devices are cascaded in use, it is judged whether a lower-level all-optical RE device is sending information, and if yes, the OAM information after the adaptation processing is sent to the uplink optical signal modulation unit of the all-optical RE device after the lower-level all-optical RE device completes sending the information, so as to avoid a conflict of optical signals.

The uplink optical signal modulation unit is configured to perform encapsulation and modulation processing such as conversion on the uplink OAM information that is transmitted from the OAM information processing unit and needs to be sent to the OLT device, and transmit the optical signal after the modulation processing to the optical signal distribution unit. The uplink optical signal modulation unit includes an OAM information encapsulation module, an OAM information modulation module, and a variable optical attenuator (VOA, Variable Optical Attenuator).

The OAM information encapsulation module in the uplink optical signal modulation unit is configured to encapsulate the received uplink OAM information and transmit the encapsulated uplink OAM information to the OAM information modulation module.

The OAM information modulation module in the uplink optical signal modulation unit is configured to modulate the uplink OAM information transmitted from the OAM information encapsulation module, convert the uplink OAM information into a control signal of the VOA, and transmit the control signal to the VOA.

The VOA in the uplink optical signal modulation unit is configured to change, according to the control signal transmitted from the OAM information modulation module, the intensity of the downlink optical signal which is sent by the OLT device and passes through the VOA, and output the downlink optical signal whose intensity is changed.

The control unit is configured to generate the uplink OAM information that needs to be reported to the OLT device and send the uplink OAM information to the OAM information processing unit, and receive the downlink OAM information sent by the OAM information processing unit.

The optical signal distribution unit is configured to return the modulated optical signal transmitted from the uplink optical signal modulation unit to the OLT device through a coupler, in which the return path is relevant to the design of a Diplexer (diplexer) inside the all-optical RE device, and the Diplexer inside the all-optical RE device may be a wavelength filter or a circulator.

In actual application, the OAM information processing unit may be integrated in the control unit of the all-optical RE device, and may also be disposed separately from the control unit.

Embodiment 3

Figure 5:
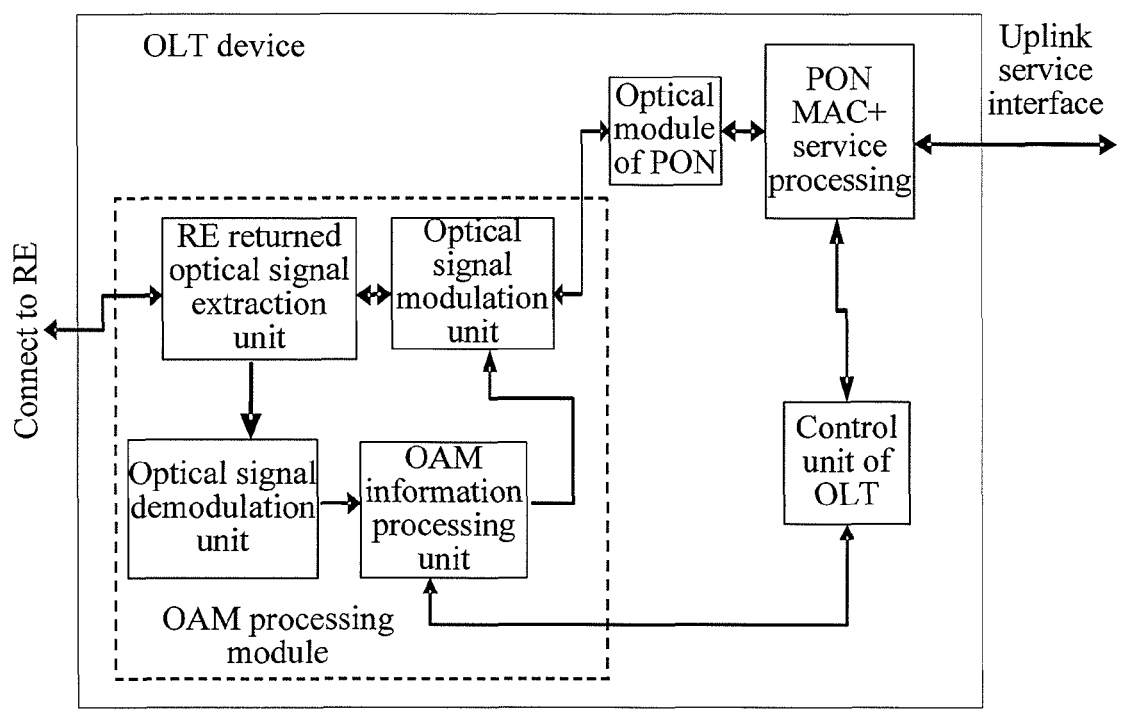
FIG. 5 is a schematic structural diagram of an OLT device provided in Embodiment 3 of the present invention.

FIG. 5 is a schematic structural diagram of an OLT device provided in the embodiment. As shown in FIG. 5, the OLT device includes the following modules: an RE returned optical signal extraction unit, an optical signal demodulation unit, an OAM information processing unit, an optical signal modulation unit, and a control unit.

The RE returned optical signal extraction unit is configured to extract an optical signal returned by an RE device from optical signals received by the OLT and transmit the optical signal to the optical signal demodulation unit.

The optical signal demodulation unit is configured to extract a modulated signal from the optical signal transmitted from the RE returned optical signal extraction unit, perform a demodulation process, corresponding to modulation of the all-optical RE device, on the modulated signal to obtain uplink OAM information reported by the all-optical RE device in the modulated signal, and transmit the uplink OAM information to the OAM information processing unit. In actual application, the optical signal from the all-optical RE device may have great amplitude variation, and special processing, for example, filtering or FFT (Fast Fourier Transform, fast Fourier transform) transform, is required in design.

The OAM information processing unit is configured to perform adaptation processing on the uplink OAM information transmitted from the optical signal demodulation unit, and send the uplink OAM information after the adaptation processing to the control unit of the OLT device, in which the adaptation processing mainly includes: performing necessary format conversion on the uplink OAM information according to information format requirements of the control unit of the OLT device; collect, from the control unit of the OLT device, downlink OAM information that needs to be sent to the RE device, perform adaptation processing on the downlink OAM information, and send the downlink OAM information after the adaptation processing to the optical signal modulation unit.

The optical signal modulation unit is configured to perform encapsulation and modulation processing such as conversion on the downlink OAM information that is transmitted from the OAM information processing unit and needs to be sent to the RE to form a control signal of a VOA, and use the control signal to change the intensity of a downlink optical signal which is sent by the OLT device and passes through the VOA, so as to deliver the downlink OAM information to the all-optical RE device. The optical signal modulation unit includes an OAM information encapsulation module, an OAM information modulation module, and the VOA.

The OAM information encapsulation module in the optical signal modulation unit is configured to encapsulate the received downlink OAM information and transmit the encapsulated downlink OAM information to the OAM information modulation module.

The OAM information modulation module in the optical signal modulation unit is configured to modulate the downlink OAM information transmitted from the OAM information encapsulation module, convert the downlink OAM information into the control signal of the VOA, and transmit the control signal to the VOA.

The VOA in the optical signal modulation unit is configured to change, according to the control signal transmitted from the OAM information modulation module, the intensity of the downlink optical signal which is sent by the OLT device and passes through the VOA, and output the downlink optical signal whose intensity is changed.

The control unit is configured to generate the downlink OAM information that needs to be sent to the RE device and send the downlink OAM information to the OAM information processing unit, and receive the uplink OAM information sent by the OAM information processing unit.

In actual application, the optical modulated signal sent out by the optical signal modulation unit in the OLT device may also be received by the optical signal demodulation unit in the OLT device, so optical modulation manners of the OLT device and the all-optical RE device need to be different. For example, when frequency modulation is used, the OLT device and the all-optical RE device use different frequency points, and the optical signal demodulation unit of the OLT device uses a bandpass filter to filter modulated signals sent out by the OLT device itself.

A Diplexer inside the OLT device may be a coupler, a wavelength filter, or a circulator.

In actual application, the OAM information processing unit may be integrated in the control unit of the OLT device, and may also be disposed separately from the control unit.

Embodiment 4

The processing flow of a method for an RE device to transfer uplink OAM information to an OLT device provided in the embodiment includes the following steps.

Step s1: The all-optical RE device generates uplink OAM information that needs to be transferred to the OLT device and performs adaptation processing on the uplink OAM information.

The adaptation processing mainly includes: performing necessary format conversion on the OAM information according to information format requirements of an uplink optical signal modulation unit of the all-optical RE device.

When all-optical RE devices are cascaded in use, it is further necessary to judge whether any other all-optical RE device is sending data, and if yes, the uplink OAM information is processed after the other all-optical RE device completes sending the data.

Step s2: Encapsulate the uplink OAM information after the adaptation processing to adapt to a specific physical transmission channel. For example, encapsulation in the format such as PPP (Point-to-Point Protocol), HDLC (High level Data Link Control), LAPS (Link Access Procedure-SDH), GFP (Generic Framing Procedure), GMP (Generic Mapping Procedure), or a custom format is performed on the uplink OAM information, so as to determine a start/end position and an adaptation channel rate of the uplink OAM information.

Then, the encapsulated OAM information is converted into a control signal of a VOA according to a set modulation manner, and the control signal is transmitted to the VOA.

The all-optical RE device further separates a part of optical signals from continuous downlink optical signals of a PON system, and transmits the part of optical signals to the VOA. The VOA changes, according to the received control signal, the intensity of the part of optical signals passing through the VOA, superimposes the OAM information on the part of optical signals, and implements the process of modulating the part of optical signals.

Afterwards, the optical signal whose intensity is modulated by the VOA is coupled to an uplink direction through a coupler and sent to the OLT device.

Step s3: The OLT device obtains, from the received optical signal, the optical signal whose intensity is modulated that is sent from the all-optical RE device.

Step s4: Perform signal amplification, bandpass filtering, and interfering signal removal processing on the optical signal, and then perform OAM information demodulation and OAM information decapsulation opposite to those of the all-optical RE device to obtain the uplink OAM information sent from the all-optical RE device, so as to implement the process of uploading the uplink OAM information from the all-optical RE device to the OLT device once.

In the embodiment, since a signal sent from an ONU to the OLT device is a burst optical signal, and the VOA of the all-optical RE device cannot use the optical signal sent out by the ONU, the all-optical RE device separates a part of optical signals from continuous downlink optical signals of the PON system and sends the part of optical signals to the VOA of the all-optical RE device for amplitude modulation, ensuring that input optical signals of the VOA of the all-optical RE device are continuous and the VOA can be used to send OAM information continuously to the OLT device.

Embodiment 5

The processing flow of a method for an OLT device to transfer downlink OAM information to an all-optical RE device provided in the embodiment includes the following steps.

Step p1: The OLT device generates downlink OAM information that needs to be transferred to the all-optical RE device and performs adaptation processing on the downlink OAM information. The adaptation processing mainly includes: performing necessary format conversion on the downlink OAM information according to information format requirements of an optical signal modulation unit of the OLT device.

Step p2: Encapsulate the downlink OAM information after the adaptation processing to adapt to a specific physical transmission channel. For example, encapsulation in the format such as PPP, HDLC, LAPS, GFP, GMP, or a custom format is performed on the downlink OAM information, so as to determine a start/end position and an adaptation channel rate of the downlink OAM information.

Then, the encapsulated downlink OAM information is converted into a control signal of a VOA according to a set modulation manner, and the control signal is transmitted to the VOA. The VOA changes, according to the received control signal, the intensity of a downlink optical signal which is sent by the OLT device and passes through the VOA, superimposes the downlink OAM information on the downlink optical signal, and implements the process of modulating the downlink optical signal. Afterwards, the modulated downlink optical signal is sent to the all-optical RE device, thereby delivering the downlink OAM information to the all-optical RE device.

Step p3: After the all-optical RE device receives the modulated optical signal from the OLT device, the all-optical RE device performs OAM information demodulation and OAM information decapsulation opposite to those of the OLT device on the optical signal to obtain the downlink OAM information sent from the OLT device, so as to implement the process of delivering the downlink OAM information from the OLT device to the all-optical RE device once.

Persons of ordinary skill in the art may understand that, all or a part of processes in the method according to the embodiments may be accomplished by relevant hardware under instructions of a computer program. The program may be stored in a computer-readable storage medium. When the program is executed, the process of the method according to the embodiments may be performed. The storage medium may be a magnetic disk, an optical disk, a read-only memory (Read-Only Memory, ROM), a random access memory (Random Access Memory, RAM), and the like.

Based on the above, in the embodiments of the present invention, OAM information is transmitted between the RE device and the OLT device, and the administration and control function for the all-optical RE device by the OLT device is implemented, without affecting the existing PON system or increasing the line speed of the PON.

In the embodiments of the present invention, the all-optical RE device can send OAM information to the OLT device independently of any other device, and the function and performance of the all-optical RE device can be extended and improved, for example, PON protection is supported in a better way, and protection switching speed and success rate of the PON system are increased.

The embodiments of the present invention do not affect the existing PON system, are downward-compatible with existing PON devices, and can protect user investment, provide the possibility of future upgrading, and reduce the maintenance and use cost of the LR-PON system.

The embodiments of the present invention are further applicable to performing OAM on other types of optical burst relay devices, for example, a burst all-optical relay of a WDM (wavelength division multiplex, wavelength division multiplex)-PON.

The above descriptions are merely exemplary embodiments of the present invention, but not intended to limit the protection scope of the present invention. All variations or substitutions that can be easily figured out by persons skilled in the art within the technical scope of the present invention should fall within the protection scope of the present invention. Therefore, the protection scope of the invention is defined by the protection scope of the claims.

What is claimed is:

1. A Reach Extension (RE) device, comprising:
   a downlink optical signal demodulation unit, configured to demodulate a downlink optical signal sent by an Optical Line Terminal (OLT) device to obtain downlink Operation, Administration and Maintenance (OAM) information that is comprised in the downlink optical signal and sent by the OLT device to the RE device;
   an OAM information processing unit, configured to receive the downlink OAM information sent by the downlink optical signal demodulation unit;
   a control unit, configured to generate uplink OAM information that needs to be reported to the OLT device and send the uplink OAM information to the OAM information processing unit, and receive the downlink OAM information sent by the OAM information processing unit; and
   an uplink optical signal modulation unit, configured to perform modulation processing, according to the uplink OAM information sent by the OAM information processing unit, on the downlink optical signal sent by the OLT device, and send the optical signal after the modulation processing and comprising the uplink OAM information to the OLT device.

2. The RE device according to claim 1, wherein the RE device further comprises:
   a downlink optical signal splitter unit, configured to split the downlink optical signal sent by the OLT device into three signals and send them to the downlink optical signal demodulation unit, the uplink optical signal modulation unit, and an optical amplifier in the downlink direction of the RE device respectively.

3. The RE device according to claim 1, wherein:
   when the RE devices are cascaded in use, the OAM information processing unit is further configured to judge whether a lower-level RE device is sending data, and if yes, the OAM information is transmitted to the uplink optical signal modulation unit after the lower-level RE device completes sending the data.

4. The RE device according to claim 1, wherein the uplink optical signal modulation unit comprises:
   an OAM information encapsulation module, configured to encapsulate the received uplink OAM information and transmit the encapsulated uplink OAM information to an OAM information modulation module;
   the OAM information modulation module, configured to modulate the uplink OAM information transmitted from the OAM information encapsulation module, convert the uplink OAM information into a control signal of a variable optical attenuator, and transmit the control signal to the variable optical attenuator; and
   the variable optical attenuator, configured to change, according to the control signal transmitted from the OAM information modulation module, the intensity of the downlink optical signal which is sent by the OLT device and passes through the variable optical attenuator, and output the downlink optical signal whose intensity is changed.

5. An OLT device, comprising:
   an RE returned optical signal extraction unit, configured to extract an optical signal returned by an RE device from optical signals received by the OLT device;
   an optical signal demodulation unit, configured to demodulate the optical signal sent by the RE returned optical signal extraction unit to obtain uplink OAM information in the optical signal;
   an OAM information processing unit, configured to receive the uplink OAM information sent by the optical signal demodulation unit;
   a control unit, configured to generate downlink OAM information that needs to be sent to the RE device and send the downlink OAM information to the OAM information processing unit, and receive the uplink OAM information sent by the OAM information processing unit; and
   an optical signal modulation unit, configured to perform modulation processing, according to the downlink OAM information sent by the OAM information processing unit, on a downlink optical signal sent to the RE device, and send the optical signal after the modulation processing and comprising the downlink OAM information to the RE device.

6. The OLT device according to claim 5, wherein the optical signal modulation unit comprises:
   an OAM information encapsulation module, configured to encapsulate the received downlink OAM information and transmit the encapsulated downlink OAM information to an OAM information modulation module;
   the OAM information modulation module, configured to modulate the downlink OAM information transmitted from the OAM information encapsulation module, convert the downlink OAM information into a control signal of a variable optical attenuator, and transmit the control signal to the variable optical attenuator; and the variable optical attenuator, configured to change, according to the control signal transmitted from the OAM information modulation module, the intensity of the downlink optical signal sent by the OLT device to the RE device and passing through the variable optical attenuator, and output the downlink optical signal whose intensity is changed.

7. A method for transmitting OAM information between a Reach Extension (RE) device and an Optical Line Terminal (OLT) device, the method comprising:

obtaining uplink OAM information that the RE device needs to report to the OLT device, performing modulation processing, according to the uplink OAM information, on a downlink optical signal sent by the OLT device, and sending the optical signal after the modulation processing and comprising the uplink OAM information to the OLT device;

obtaining downlink OAM information that the OLT device needs to deliver to the RE device, performing modulation processing, according to the downlink OAM information, on a downlink optical signal sent by the OLT device to the RE device, and sending the optical signal after the modulation processing and comprising the downlink OAM information to the RE device.

8. The method according to claim 7, wherein the performing the modulation processing, according to the uplink OAM information, on the downlink optical signal sent by the OLT device, and sending the optical signal after the modulation processing and comprising the uplink OAM information to the OLT device comprises:

performing encapsulation and modulation processing on the uplink OAM information, and converting the uplink OAM information into a control signal of a variable optical attenuator; and separating a part of optical signals from downlink optical signals sent by the OLT device, changing, according to the control signal, the intensity of the part of optical signals passing through the variable optical attenuator, and returning the part of optical signals whose intensity is changed to the OLT device.

9. The method according to claim 7, wherein the method further comprises:

when the RE devices are cascaded in use, when a lower-level RE device is sending data to the OLT device, sending the optical signal after the modulation processing and comprising the uplink OAM information to the OLT device after the lower-level RE device completes sending the data.

10. The method according to claim 7, wherein the method further comprises:

performing a demodulation process, corresponding to modulation of the optical signal of the OLT device, on the downlink optical signal sent by the OLT device to obtain downlink OAM information that is comprised in the downlink optical signal and sent by the OLT device to the RE device; and performing adaptation processing on the downlink OAM information, and sending the downlink OAM information after the adaptation processing to a control unit of the RE device.

11. The method according to claim 7, wherein the performing the modulation processing, according to the downlink OAM information, on the downlink optical signal sent by the OLT device to the RE device, and sending the optical signal after the modulation processing and comprising the downlink OAM information to the RE device comprises:

performing encapsulation and modulation processing on the downlink OAM information, and converting the downlink OAM information into a control signal of a variable optical attenuator; and changing, according to the control signal, the intensity of the downlink optical signal sent by the OLT device to the RE device and passing through the variable optical attenuator, and sending the downlink optical signal whose intensity is changed to the RE device.

12. The method according to claim 7, wherein the method further comprises:

extracting an optical signal sent by the RE device from optical signals received by the OLT device, performing a demodulation process, corresponding to modulation of the RE device, on the optical signal to obtain the uplink OAM information in the optical signal; and performing adaptation processing on the uplink OAM information, and sending the uplink OAM information after the adaptation processing to a control unit of the OLT device.

13. A communication system in a passive optical network, the system comprising:

a Reach Extension (RE) device, comprising:
a downlink optical signal demodulation unit, configured to demodulate a downlink optical signal sent by an Optical Line Terminal (OLT) device to obtain downlink Operation, Administration and Maintenance (OAM) information that is comprised in the downlink optical signal and sent by the OLT device to the RE device, an OAM information processing unit, configured to receive the downlink OAM information sent by the downlink optical signal demodulation unit, a control unit, configured to generate uplink OAM information that needs to be reported to the OLT device and send the uplink OAM information to the OAM information processing unit, and receive the downlink OAM information sent by the OAM information processing unit, and an uplink optical signal modulation unit, configured to perform modulation processing, according to the uplink OAM information sent by the OAM information processing unit, on the downlink optical signal sent by the OLT device, and send the optical signal after the modulation processing and comprising the uplink OAM information to the OLT device;

wherein the OLT device, comprises:
an RE returned optical signal extraction unit, configured to extract an optical signal returned by an RE device from optical signals received by the OLT device, an optical signal demodulation unit, configured to demodulate the optical signal sent by the RE returned optical signal extraction unit to obtain uplink OAM information in the optical signal, an OAM information processing unit, configured to receive the uplink OAM information sent by the optical signal demodulation unit, a control unit, configured to generate downlink OAM information that needs to be sent to the RE device and send the downlink OAM information to the OAM information processing unit, and receive the uplink OAM information sent by the OAM information processing unit, and an optical signal modulation unit, configured to perform modulation processing, according to the downlink OAM information sent by the OAM information processing unit, on a downlink optical signal sent to the RE device, and send the optical signal after the modulation processing and comprising the downlink OAM information to the RE device;

wherein the RE device performs modulation processing, according to uplink OAM information that needs to be reported to the OLT device, on a downlink optical signal sent by the OLT device, and sends the optical signal after the modulation processing and comprising the uplink OAM information to the OLT device; and wherein the OLT device performs modulation processing, according to downlink OAM information that needs to be delivered to the RE device, on a downlink optical signal sent by the OLT device to the RE device, and sends the optical signal after the modulation processing and comprising the downlink OAM information to the RE device.

* * * * *